(12) United States Patent
Huang et al.

(10) Patent No.: US 10,253,809 B2
(45) Date of Patent: Apr. 9, 2019

(54) SHAFT CONTROL METHOD AND DEVICE FOR MAGNETIC SUSPENSION SYSTEM

(71) Applicant: Green Refrigeration Equipment Engineering Research Center of ZHUHAI GREE CO., Ltd., Zhuhai, Guangdong (CN)

(72) Inventors: Hui Huang, Zhuhai (CN); Yusheng Hu, Zhuhai (CN); Dongsuo Chen, Zhuhai (CN); Yan Li, Zhuhai (CN); Weilin Guo, Zhuhai (CN); Daofu Hu, Zhuhai (CN)

(73) Assignee: GREEN REFRIGERATION EQUIPMENT ENGINEERING RESEARCH CENTER OF ZHUHAI GREE CO., LTD., Zhuhai, Guangdong (CN)

( * ) Notice: Subject to any disclaimer, the term of this patent is extended or adjusted under 35 U.S.C. 154(b) by 298 days.

(21) Appl. No.: 15/021,724

(22) PCT Filed: Aug. 1, 2014

(86) PCT No.: PCT/CN2014/083592
§ 371 (c)(1),
(2) Date: Mar. 14, 2016

(87) PCT Pub. No.: WO2015/035836
PCT Pub. Date: Mar. 19, 2015

(65) Prior Publication Data
US 2016/0230810 A1    Aug. 11, 2016

(30) Foreign Application Priority Data

Sep. 12, 2013 (CN) .......................... 2013 1 0416595

(51) Int. Cl.
*F16C 32/04* (2006.01)
*G05B 6/02* (2006.01)

(52) U.S. Cl.
CPC ...... *F16C 32/0451* (2013.01); *F16C 32/0487* (2013.01); *G05B 6/02* (2013.01); *F16C 32/048* (2013.01)

(58) Field of Classification Search
None
See application file for complete search history.

(56) References Cited

U.S. PATENT DOCUMENTS 4,885,491 A * 12/1989 Hiyama .............. F16C 32/0451
  310/90.5
5,061,679 A    10/1991 Weeks, II
(Continued)

FOREIGN PATENT DOCUMENTS

CN    1738183 A    2/2006
CN    101247097 A    2/2008
(Continued)

*Primary Examiner* — Mohammad Ali
*Assistant Examiner* — Vincent W Chang
(74) *Attorney, Agent, or Firm* — Li & Cai Intellectual Property (USA) Office (57) ABSTRACT

A shaft control method and device for a magnetic suspension system. The shaft control method for the magnetic suspension system includes: acquiring a displacement signal obtained by detecting displacement of a shaft in the magnetic suspension system (Step 101); separating whirling displacement from the displacement signal (Step 102); and controlling whirling of the shaft according to the whirling displacement (Step 103). By the disclosure, the effect of suppressing the whirling of the shaft during high-speed rotation of the magnetic suspension system is achieved.

8 Claims, 4 Drawing Sheets

(56) References Cited

U.S. PATENT DOCUMENTS

| | | | | |
|---|---|---|---|---|
| 5,376,871 A | * | 12/1994 | Takara | F16C 32/0451 |
| | | | | 318/115 |
| 5,645,487 A | * | 7/1997 | Lloyd | F16D 3/2055 |
| | | | | 464/111 |
| 2013/0229079 A1 | * | 9/2013 | Omori | F04D 19/042 |
| | | | | 310/90.5 |
| 2014/0264037 A1 | * | 9/2014 | Hoyt | G09B 23/285 |
| | | | | 250/349 |

FOREIGN PATENT DOCUMENTS

| | | |
|---|---|---|
| EP | 0612928 A1 | 8/1994 |
| JP | 02-097714 A | 4/1990 |
| JP | 06-300041 A | 10/1994 |
| JP | 07-229516 A | 8/1995 |
| JP | 2002081444 A | 3/2002 |

* cited by examiner

SHAFT CONTROL METHOD AND DEVICE FOR MAGNETIC SUSPENSION SYSTEM

TECHNICAL FIELD OF THE INVENTION

The disclosure relates to the field of control, and in particular to a shaft control method and device for a magnetic suspension system.

BACKGROUND OF THE INVENTION

For a magnetic suspension system, coupling between every two degrees of freedom is usually neglected, a decentralized control method is adopted to implement control over five degrees of freedom, and each degree of freedom is independently controlled. However, as a high-speed rotating object, a shaft of the magnetic suspension system may inevitably whirl, whirling includes cylindrical whirling and conical whirling, and conical whirling is vigorous at high speed. Cylindrical whirling is similar to translation, front and rear ends of the slender shaft of the magnetic suspension system are displaced under the same amplitude and phase during cylindrical whirling, and the front and rear ends are usually displaced in opposite directions during conical whirling. During practical work, a displacement signal detected by a sensor is displacement generated by synthesis of the two kinds of movement. Under the condition that each degree of freedom is independently controlled, whirling may not be controlled, and vigorous whirling is very likely to cause instability of the magnetic suspension system during high-speed rotation, so that it is absolutely necessary to effectively control whirling.

At present, the following method is usually adopted to suppress whirling: some decoupling control algorithms such as cross feedback control are added on the basis of decentralized control, or a centralized control method is adopted. These methods have shortcomings of algorithm complexity, heavy calculation and difficulty in implementation in a Digital Signal Processor (DSP).

For the problem of difficulty in suppression of whirling of a shaft during high-speed rotation of a magnetic suspension system in a conventional art, there is yet no effective solution.

SUMMARY OF THE INVENTION

A main purpose of the disclosure is to provide a shaft control method and device for a magnetic suspension system, so as to solve the problem of difficulty in suppression of whirling of a bearing during high-speed rotation of a magnetic suspension system in the conventional art.

In order to achieve the purpose, according to one aspect of the disclosure, a shaft control method for a magnetic suspension system is provided, the shaft control method for the magnetic suspension system according to the disclosure including: acquiring a displacement signal obtained by detecting displacement of a shaft in the magnetic suspension system; separating whirling displacement from the displacement signal; and controlling whirling of the shaft according to the whirling displacement.

Furthermore, displacement of a front end of the shaft deviated from a balance position is detected by adopting a front bearing sensor, displacement of a rear end of the shaft deviated from the balance position is detected by adopting a rear bearing sensor, and the whirling displacement is separated by adopting the following formula:

$$\begin{cases} x_{a1} = \dfrac{l_a}{l_a + l_b} * (x_a - x_b) \\ x_{b1} = \dfrac{l_b}{l_a + l_b} * (x_a - x_b) \end{cases}$$

wherein $x_{a1}$ and $x_{b1}$ are whirling displacement of the front and rear ends of the shaft respectively, $l_a$ is a distance from a mass centre of the shaft to the front bearing sensor, $l_b$ is a distance from the mass centre of the shaft to the rear bearing sensor, $x_a$ is the displacement, detected by the front bearing sensor, of the front end of the shaft deviated from the balance position, and $x_b$ is the displacement, detected by the rear bearing sensor, of the rear end of the shaft deviated from the balance position.

Furthermore, controlling the whirling of the shaft according to the whirling displacement includes: calculating a whirling angle of the shaft according to the whirling displacement; and controlling the whirling angle of the shaft to be within a preset range.

Furthermore, calculating the whirling angle of the shaft according to the whirling displacement includes calculating the whirling angle by adopting any one of the following manners:

Manner 1:

$$\alpha = \arctan\frac{x_{b1}}{l_b},$$

Manner 2:

$$\alpha = \arctan\frac{x_{a1}}{l_a}, \text{ and}$$

Manner 3:

$$\alpha = \arctan\frac{x_a - x_b}{l_a + l_b},$$

wherein $\alpha$ is the whirling angle, $x_{a1}$ and $x_{b1}$ are the whirling displacement of the front and rear ends of the shaft respectively, $l_a$ is the distance from the mass centre of the shaft to the front bearing sensor, $l_b$ is the distance from the mass centre of the shaft to the rear bearing sensor, $x_a$ is the displacement, detected by the front bearing sensor, of the front end of the shaft deviated from the balance position, and $x_b$ is the displacement, detected by the rear bearing sensor, of the rear end of the shaft deviated from the balance position.

Furthermore, separating the whirling displacement from the displacement signal includes separating the displacement signal to obtain translation displacement and the whirling displacement, and after the translation displacement is obtained, the method further includes: controlling translation of the shaft according to the translation displacement, the translation displacement including translation displacement at a front bearing and translation displacement at a rear bearing.

Furthermore, controlling the whirling of the shaft according to the whirling displacement and controlling the translation of the shaft according to the translation displacement include: controlling the translation displacement at the front bearing by adopting a first Proportion Integration Differentiation (PID) controller; controlling the translation displacement at the rear bearing by adopting a second PID controller; and controlling the whirling angle corresponding to the whirling displacement by adopting a third PID controller.

In order to achieve the purpose, according to the other aspect of the disclosure, a shaft control device for a magnetic suspension system is provided, the shaft control device for the magnetic suspension system according to the disclosure including: an acquisition unit, configured to acquire a displacement signal obtained by detecting displacement of a shaft in the magnetic suspension system; a separation unit, configured to separate whirling displacement from the displacement signal; and a control unit, configured to control whirling of the shaft according to the whirling displacement.

Furthermore, whirling displacement of a front end of the shaft is detected by adopting a front bearing sensor, whirling displacement of a rear end of the shaft is detected by adopting a rear bearing sensor, and the separation unit is configured to separate the whirling displacement by adopting the following formula:

$$\begin{cases} x_{a1} = \dfrac{l_a}{l_a + l_b} * (x_a - x_b) \\ x_{b1} = \dfrac{l_b}{l_a + l_b} * (x_a - x_b) \end{cases},$$

wherein $x_{a1}$ and $x_{b1}$ are the whirling displacement of the front and rear ends of the shaft respectively, $l_a$ is a distance from a mass centre of the shaft to the front bearing sensor, $l_b$ is a distance from the mass centre of the shaft to the rear bearing sensor, $x_a$ is displacement, detected by the front bearing sensor, of the front end of the shaft deviated from a balance position, and $x_b$ is displacement, detected by the rear bearing sensor, of the rear end of the shaft deviated from the balance position.

Furthermore, the control unit includes: a calculation unit, configured to calculate a whirling angle of the shaft according to the whirling displacement; and a control module, configured to control the whirling angle of the shaft to be within a preset range.

Furthermore, the calculation module is configured to calculate the whirling angle by adopting any one of the following manners:

Manner 1:

$$\alpha = \arctan \dfrac{x_{b1}}{l_b},$$

Manner 2:

$$\alpha = \arctan \dfrac{x_{a1}}{l_a}, \text{ and}$$

Manner 3:

$$\alpha = \arctan \dfrac{x_a - x_b}{l_a + l_b},$$

wherein $\alpha$ is the whirling angle, $x_{a1}$ and $x_{b1}$ are the whirling displacement of the front and rear ends of the shaft respectively, $l_a$ is the distance from the mass centre of the shaft to the front bearing sensor, $l_b$ is the distance from the mass centre of the shaft to the rear bearing sensor, $x_a$ is the displacement, detected by the front bearing sensor, of the front end of the shaft deviated from the balance position, and $x_b$ is the displacement, detected by the rear bearing sensor, of the rear end of the shaft deviated from the balance position.

Furthermore, the separation unit is configured to separate the displacement signal to obtain translation displacement and the whirling displacement, and the control unit is further configured to, after the translation displacement is obtained, control translation of the shaft according to the translation displacement, the translation displacement including translation displacement at a front bearing and translation displacement at a rear bearing.

Furthermore, the control unit is configured to: control the translation displacement at the front bearing by adopting a first PID controller; control the translation displacement at the rear bearing by adopting a second PID controller; and control the whirling angle corresponding to the whirling displacement by adopting a third PID controller.

According to the disclosure, the shaft control method for the magnetic suspension system includes: acquiring the displacement signal obtained by detecting the displacement of the shaft in the magnetic suspension system; separating the whirling displacement from the displacement signal; and controlling the whirling of the shaft according to the whirling displacement. The whirling displacement is separated from the displacement signal, and the whirling of the shaft is suppressed by controlling the whirling displacement, so that the problem of difficulty in suppression of the whirling of the shaft during high-speed rotation of the magnetic suspension system is solved, and the effect of suppressing the whirling of the shaft during high-speed rotation of the magnetic suspension system is further achieved.

BRIEF DESCRIPTION OF THE DRAWINGS

The drawings forming a part of the disclosure are adopted to provide further understanding of the disclosure, and schematic embodiments of the disclosure and description thereof are adopted to explain the disclosure and not intended to form improper limits to the disclosure. In the drawings.

DETAILED DESCRIPTION OF THE EMBODIMENTS

It is important to note that the embodiments in the disclosure and characteristics in the embodiments can be combined under the condition of no conflicts. The disclosure will be described below with reference to the drawings and the embodiments in detail.

Figure 1:
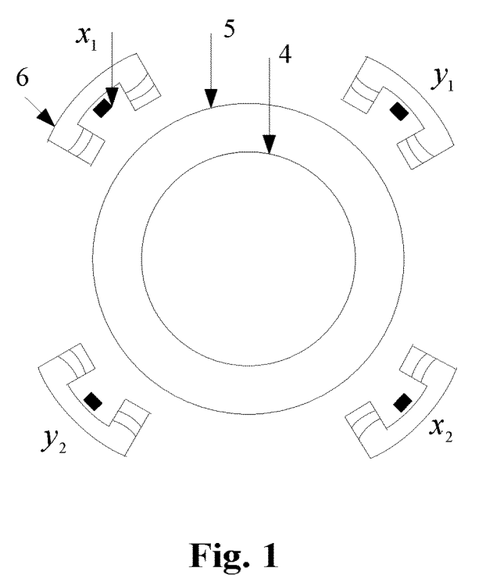
FIG. 1 is a structure diagram of a magnetic suspension radial bearing according to an embodiment of the disclosure.

FIG. 1 is a sectional diagram of a magnetic suspension system according to an embodiment of the disclosure. As shown in FIG. 1, the magnetic suspension system includes a shaft, protective bearings, bearing coils and sensors. The protective bearings are configured to determine relative positions of the shaft and the other parts, and have supporting and guiding functions. When the bearing coils around the bearings are energized to generate electromagnetic force, the shaft may suspend in the magnetic suspension system for work and rotate at high speed. $x_1$, $y_1$, $x_2$ and $y_2$ are all sensors, are displacement sensors in the embodiment, and are configured to measure displacement signals of the shaft.

Figure 2:
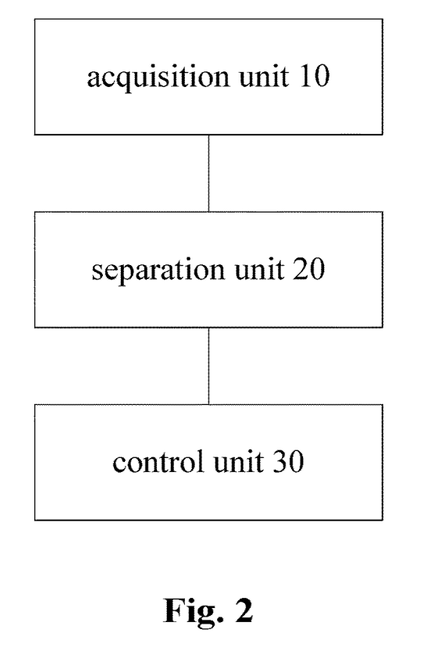
FIG. 2 is a diagram of a shaft control device for a magnetic suspension system according to a first embodiment of the disclosure.

FIG. 2 is a diagram of a shaft control device for a magnetic suspension system according to a first embodiment of the disclosure. As shown in FIG. 2, the shaft control device for the magnetic suspension system includes an acquisition unit 10, a separation unit 20 and a control unit 30. The acquisition unit 10 is configured to acquire a displacement signal obtained by detecting displacement of a shaft in the magnetic suspension system, and since the displacement of the shaft includes translation displacement and whirling displacement, the detected displacement signal includes translation displacement and whirling displacement. The displacement signal may be detected through a displacement sensor. The separation unit 20 is configured to separate the whirling displacement from the displacement signal, and since the displacement signal detected by the displacement sensor includes the translation displacement and the whirling displacement, the separation unit 20 separates the whirling displacement from the displacement signal to separate the translation displacement and the whirling displacement for control, wherein a separation algorithm may be adopted for separation of the whirling displacement in a process of separating the whirling displacement from the displacement signal. The control unit 30 is configured to control whirling of the shaft according to the whirling displacement, and since the shaft whirls more vigorously if the whirling displacement of the shaft is longer, the control unit 30 regulates and reduces the whirling displacement separated by the separation unit 20 to fulfill the aim of controlling the whirling of the shaft.

According to the embodiment of the disclosure, the shaft control device for the magnetic suspension system is adopted to separate the whirling displacement from the displacement signal and control and reduce the whirling displacement to further suppress the whirling of the shaft through the control unit 30, so that the problem of difficulty in suppression of the whirling of the shaft during high-speed rotation of the magnetic suspension system is solved, and the effect of suppressing the whirling of the shaft during high-speed rotation of the magnetic suspension system is further achieved.

In the embodiment of the disclosure, displacement of a front end of the shaft deviated from a balance position is detected by adopting a front bearing sensor, displacement of a rear end of the shaft deviated from the balance position is detected by adopting a rear bearing sensor, and the separation unit 20 is configured to separate the whirling displacement by adopting the following formula:

$$\begin{cases} x_{a1} = \dfrac{l_a}{l_a + l_b} * (x_a - x_b) \\ x_{b1} = \dfrac{l_b}{l_a + l_b} * (x_a - x_b) \end{cases},$$

wherein $x_{a1}$ and $x_{b1}$ are the whirling displacement of the front and rear ends of the shaft respectively, $l_a$ is a distance from a mass centre of the shaft to the front bearing sensor, $l_b$ is a distance from the mass centre of the shaft to the rear bearing sensor, $x_a$ is the displacement, detected by the front bearing sensor, of the front end of the shaft deviated from the balance position, and $x_b$ is the displacement, detected by the rear bearing sensor, of the rear end of the shaft deviated from the balance position. $x_a$ and $x_b$ may be obtained by the front bearing sensor and the rear bearing sensor. The front bearing sensor and the rear bearing sensor detect actually detected displacement values of the front and rear ends of the shaft respectively, and the displacement of the front and rear ends of the shaft deviated from the balance position may be obtained by subtracting the actually detected displacement values of the front and rear ends of the shaft from displacement reference values, wherein the displacement reference values are distances between the front and rear bearing sensors and the balance position.

Figure 3:
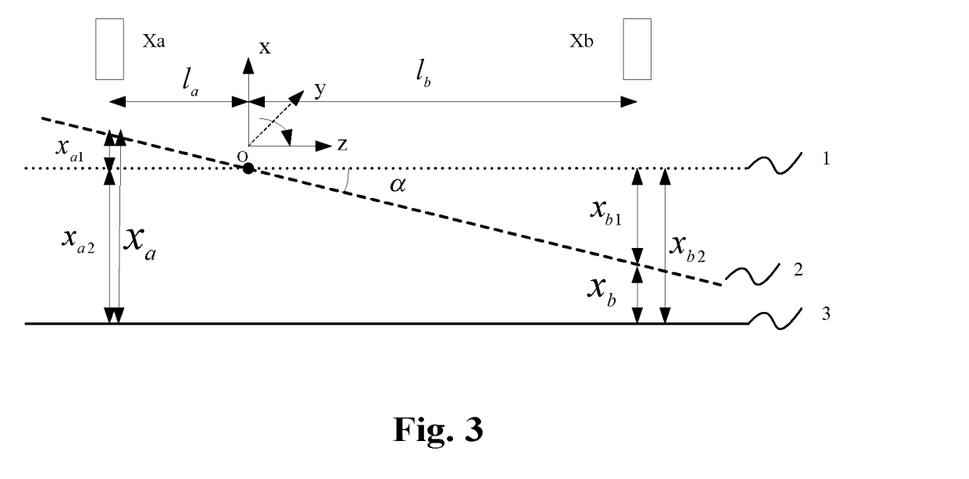
FIG. 3 is a diagram of a position of a shaft at a certain moment during rotation according to an embodiment of the disclosure.

FIG. 3 is a diagram of a position of a shaft at a certain moment during rotation according to an embodiment of the disclosure. As shown in FIG. 3, the front bearing sensor is Sensor Xa, the rear bearing sensor is Sensor Xb, xz plane is parallel to a principal plane, a y direction is perpendicular to the principal plane, the mass centre O of the shaft is determined as an origin o, $l_a$ is a horizontal distance from the mass centre of the shaft to the front bearing sensor, $l_b$ is a horizontal distance from the mass centre of the shaft to the rear bearing sensor, $x_{a1}$ and $x_{b1}$ are the whirling displacement of the shaft at front and rear bearings respectively, $x_{a2}$ and $x_{b2}$ are translation displacement of the shaft at the front and rear bearings respectively, and $\alpha$ is a whirling angle. In order to simplify the figure and facilitate description, the shaft of the magnetic suspension system is replaced with an axis, as shown by dotted line 2 in the figure, wherein the balance position is represented by solid line 2, and dotted line 1 represents a position of the axis which is horizontal.

From FIG. 3, it can be seen that the shaft performs translation movement and whirling movement in a working process, and its displacement meets relational expression (1):

$$\begin{cases} x_a = x_{a1} + x_{a2} \\ x_b = x_{b2} - x_{b1} \\ x_{a2} = x_{b2} \end{cases} \quad (1)$$

the second formula is subtracted from the first formula in the relational expression to obtain: $x_a - x_b = x_{a1} + x_{b1}$, and according to FIG. 3, the following relational expression may also be obtained:

$$\begin{cases} \dfrac{x_{a1}}{x_{a1} + x_{b1}} = \dfrac{l_a}{l_a + l_b} \\ \dfrac{x_{b1}}{x_{a1} + x_{b1}} = \dfrac{l_b}{l_a + l_b} \end{cases},$$

so that a relational expression of the whirling displacement at the front and rear bearings may be obtained:

$$\begin{cases} x_{a1} = \dfrac{l_a}{l_a + l_b} * (x_a - x_b) \\ x_{b1} = \dfrac{l_b}{l_a + l_b} * (x_a - x_b) \end{cases} \quad (2)$$

The whirling displacement at the front and rear bearings is obtained according to the abovementioned algorithm, and a calculation process is simple, and is easy to implement in processing equipment such as a DSP. In the embodiment, the algorithm may be executed through the separation unit 20, the separation unit 20 separates the whirling displacement from the displacement signal detected by the sensor, and the control unit 30 determines the whirling displacement as a control parameter of the shaft in the magnetic suspension system, and reduces the displacement $x_{a1}$ at the front bearing and the displacement $x_{b1}$ at the rear bearing to fulfill the aim of suppressing the whirling of the shaft, achieve the effect of effectively suppressing the whirling of the shaft and improve stability of the magnetic suspension system.

Figure 4:
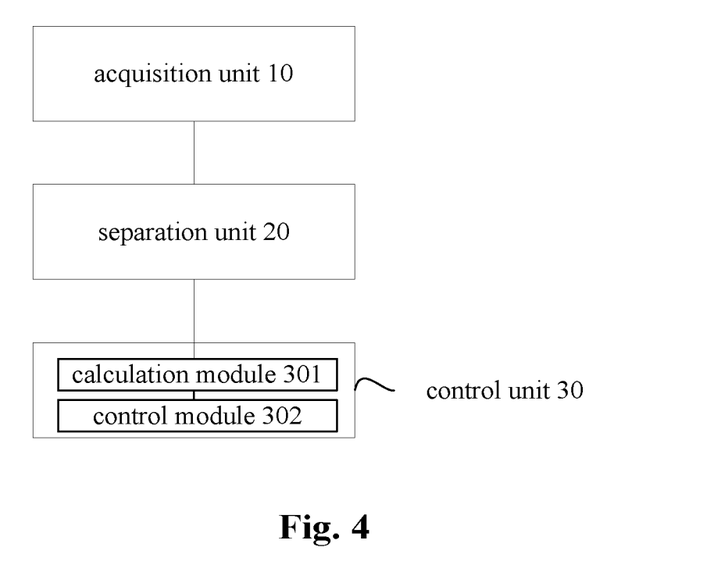
FIG. 4 is a diagram of a shaft control device for a magnetic suspension system according to a second embodiment of the disclosure.

FIG. 4 is a diagram of a shaft control device for a magnetic suspension system according to a second embodiment of the disclosure. The shaft control device for the magnetic suspension system in the embodiment may be considered as a preferred implementation mode of the shaft control device for the magnetic suspension system shown in FIG. 2. As shown in FIG. 4, the shaft control device for the magnetic suspension system includes the acquisition unit 10, the separation unit 20 and the control unit 30, wherein the control unit 30 includes a calculation module 301 and a control module 302.

The calculation module 301 is configured to calculate a whirling angle of the shaft according to the whirling displacement, the corresponding whirling angle is larger if the whirling displacement of the shaft is longer, and the calculation module 301 calculates the whirling angle corresponding to the whirling displacement, and determines the whirling angle as a control parameter to control the whirling of the shaft. The control module 302 is configured to control the whirling angle of the shaft to be within a preset range. The preset range is kept within a small range in the vicinity of 0, and since the shaft whirls more vigorously and its corresponding whirling angle is larger if the whirling displacement of the shaft is longer, the whirling angle is effectively controlled to be in the vicinity of 0, and the whirling angle is controlled to be close to 0 as much as possible to effectively suppress the whirling of the shaft.

Preferably, before the whirling angle of the shaft is controlled, the whirling angle of the shaft is further enlarged. Since a value of the calculated whirling angle of the shaft is very small, the whirling angle is required to be enlarged before the whirling angle of the shaft is controlled, and an enlargement factor may be set according to a practical condition. A whirling angle ring is configured to control the whirling angle, a control parameter of the whirling angle ring is very large if the whirling angle is not enlarged, and enlarging the whirling angle may prevent the control parameter of the whirling angle ring from getting too large and facilitate debugging of the control parameter of the whirling angle ring to implement accurate control over the whirling angle, further achieve the effect of suppressing the whirling of the shaft and avoid the condition of instability caused by highly-frequent whirling of the magnetic suspension system.

Preferably, the calculation module 301 is configured to calculate the whirling angle by adopting any one of the following manners:

$$\text{Manner 1: } \alpha = \arctan\frac{x_{b1}}{l_b}; \text{Manner 2: } \alpha = \arctan\frac{x_{a1}}{l_a}; \text{ and }$$
$$\text{Manner 3: } \alpha = \arctan\frac{x_a - x_b}{l_a + l_b},$$

wherein $\alpha$ is the whirling angle, $x_{a1}$ and $x_{b1}$ are the whirling displacement of the front and rear ends of the shaft respectively, $l_a$ is the distance from the mass centre of the shaft to the front bearing sensor, $l_b$ is the distance from the mass centre of the shaft to the rear bearing sensor, $x_a$ is the displacement, detected by the front bearing sensor, of the front end of the shaft deviated from the balance position, and $x_b$ is the displacement, detected by the rear bearing sensor, of the rear end of the shaft deviated from the balance position. According to FIG. 3 and the relational expression (2), it can be seen that $$\tan\alpha = \frac{x_{b1}}{l_b} = \frac{x_{a1}}{l_a} = \frac{x_a - x_b}{l_a + l_b},$$

and since a value of $\alpha$ is very small and its corresponding sine value is approximately equal to the value of $\alpha$, that is, $$\alpha \approx \frac{x_{b1}}{l_b} = \frac{x_{a1}}{l_a} = \frac{x_a - x_b}{l_a + l_b},$$

a value obtained by calculating $$\frac{x_{a1}}{l_a}, \frac{x_{b1}}{l_b} \text{ and } \frac{x_a - x_b}{l_a + l_b}$$

is directly determined as the value of the whirling angle $\alpha$ in the embodiment to simplify calculation of the whirling angle and further implement control over the whirling angle to suppress the whirling of the shaft.

Preferably, the separation unit 20 is configured to separate the displacement signal to obtain the translation displacement and the whirling displacement, and the control unit 30 is further configured to, after the translation displacement is obtained, control translation of the shaft according to the translation displacement, the translation displacement including the translation displacement at the front bearing and the translation displacement at the rear bearing. The displacement signal detected by the sensor includes the whirling displacement and the translation displacement, wherein a displacement signal detected by the front bearing sensor includes the whirling displacement at the front bearing and the translation displacement at the front bearing, and a displacement signal detected by the rear bearing sensor includes the whirling displacement at the rear bearing and the translation displacement at the rear bearing. The separation unit 20 separates the displacement signal to obtain the translation displacement and the whirling displacement, and the control unit 30 is further configured to control the translation displacement obtained by separating the displacement signal and control the translation movement and whirling movement of the shaft after the translation displacement and the whirling displacement are separated respectively, so that both the whirling displacement of the shaft of the magnetic suspension system and the translation displacement of the shaft of the magnetic suspension system are suppressed, and the stability of the magnetic suspension system is further improved.

Preferably, the control unit 30 is configured to control the translation displacement at the front bearing by adopting a first PID controller, control the translation displacement at the rear bearing by adopting a second PID controller, and control the whirling angle corresponding to the whirling displacement by adopting a third PID controller. The three PID controllers are adopted to control the translation displacement at the front bearing, the translation displacement at the rear bearing and the whirling angle, so that interference among the controllers may be reduced, and separate control over the whirling and translation of the shaft is implemented.

It is important to note that "first", "second" and "third" in the embodiment do not represent a precedence relationship, are adopted to facilitate description of the embodiment of the disclosure only, and are not intended to form improper limits to the disclosure.

Figure 5:
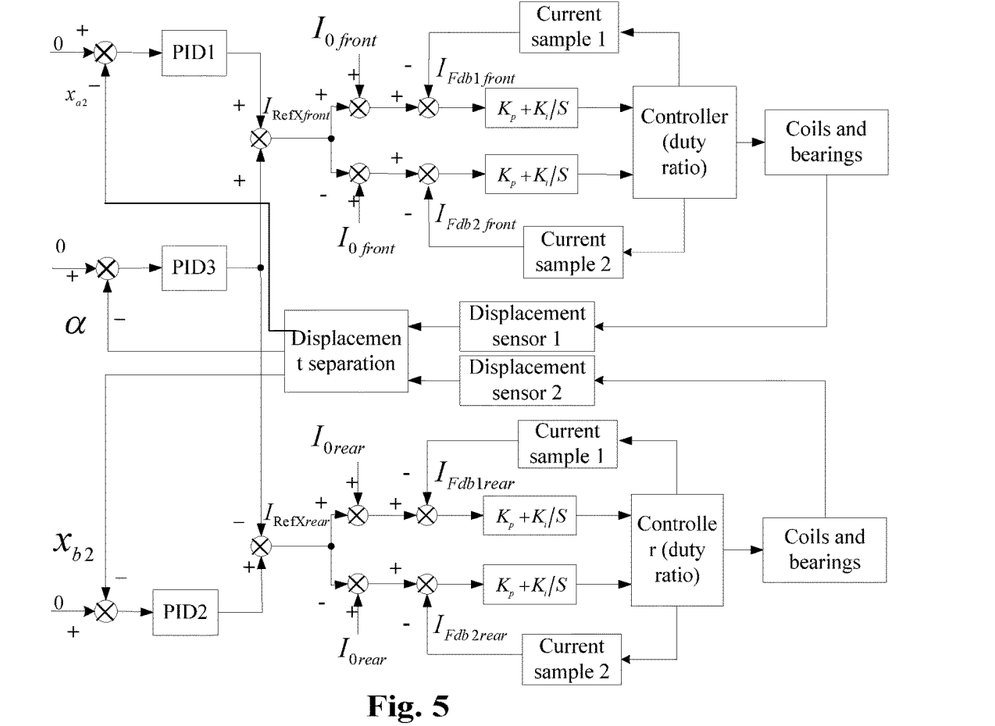
FIG. 5 is a block diagram of separate control over translation and whirling of a shaft according to an embodiment of the disclosure.

FIG. 5 is a block diagram of separate control over translation and whirling of a shaft according to an embodiment of the disclosure.

As shown in FIG. 5, PID1 is the first PID controller, PID2 is the second PID controller and PID3 is the third PID controller. When the coils are energized, the shaft in the magnetic suspension system suspends, the coils and the bearings perform corresponding work, the translation displacement at the front bearing, the translation displacement at the rear bearing and the whirling displacement are obtained by displacement separation of front and rear displacement signals, acquired by displacement sensor 1 and displacement sensor 2, of the shaft (displacement sensor 1 is the front bearing sensor mentioned in the embodiment of the disclosure and displacement sensor 2 is the rear bearing sensor mentioned in the embodiment of the disclosure), and then the whirling angle is calculated according to the whirling displacement. The translation displacement at the front bearing, the translation displacement at the rear bearing and the whirling angle are determined as feedback parameters, and are sent to feedback input ends of the first PID controller, the second PID controller and the third PID controller respectively, output of the first PID controller and output of the third PID controller are added to obtain control current $I_{Refxfront}$ in an x direction of the front bearing, the control current $I_{Refxfront}$ is added to and subtracted from bias current $I_{0front}$ in the x direction of the front bearing to obtain a current reference value $I_{Refxfront}+I_{0front}$ of the upper coil in the x direction of the front bearing and a current reference value $I_{Refxfront}-I_{0front}$ of the lower coil respectively, current values, detected by a current sensor, of the upper and lower coils are determined as current feedback values $I_{fdb1front}$ and $I_{fdb2front}$ ($I_{fdb1front}$ is the current feedback value of the upper coil of the front bearing and $I_{fdb2front}$ is the current feedback value of the lower coil of the front bearing) for switching tube modulation after current loop Proportion Integration (PI) control, and a PI transfer function is $K_p+K_i/S$, wherein $K_p$ is a P parameter and $K_i$ is a K parameter. Output of the second PID controller is subtracted from the output of the third PID controller to obtain control current $I_{Refxrear}$ in an x direction of the rear bearing, the control current $I_{Refxrear}$ is added to and subtracted from bias current $I_{0rear}$ in the x direction of the rear bearing to obtain a current reference value $I_{Refxrear}+I_{0rear}$ of the upper coil in the x direction of the rear bearing and a current reference value $I_{Refxrear}-I_{0rear}$ of the lower coil respectively, current values, detected by the current sensor, of the upper and lower coils are determined as current feedback values $I_{fdb1rear}$ and $I_{fdb2rear}$ ($I_{fdb1rear}$ is the current feedback value of the upper coil of the rear bearing and $I_{fdb2rear}$ is the current feedback value of the lower coil of the rear bearing) for switching tube modulation after current loop PI control, and the PI transfer function is $K_p+K_i/S$, wherein $K_p$ is the P parameter and $K_i$ is the K parameter. The whole control process implements respective control over the translation displacement at the front bearing, the translation displacement at the rear bearing and the whirling angle, and control over the whirling angle is added to fulfil the aim of suppressing whirling.

The embodiment of the disclosure further provides a shaft control method for a magnetic suspension system. The shaft control method for the magnetic suspension system may run on computer processing equipment. It is important to note that the shaft control method for the magnetic suspension system in the embodiment of the disclosure may be executed by the shaft control device for the magnetic suspension system provided by the embodiment of the disclosure and the shaft control device for the magnetic suspension system in the embodiment of the disclosure may also be configured to execute the shaft control method for the magnetic suspension system provided by the embodiment of the disclosure.

Figure 6:
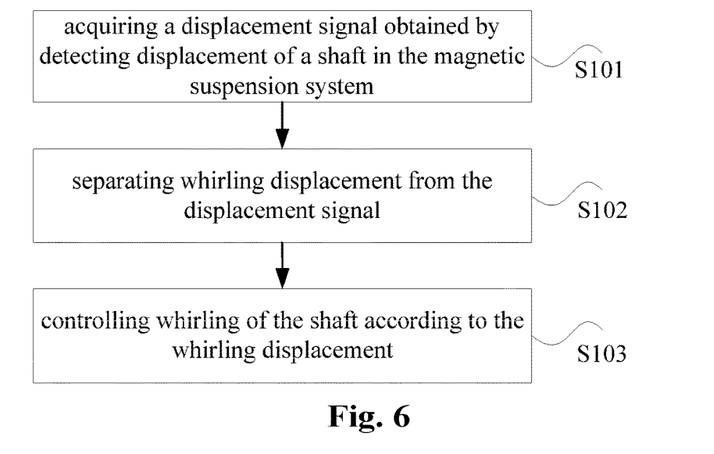
FIG. 6 is a flowchart of a shaft control method for a magnetic suspension system according to a first embodiment of the disclosure.

FIG. 6 is a flowchart of a shaft control method for a magnetic suspension system according to a first embodiment of the disclosure.

As shown in FIG. 6, the shaft control method for the magnetic suspension system includes the following steps:

Step 101: acquiring a displacement signal obtained by detecting displacement of a shaft in the magnetic suspension system, wherein since the displacement of the shaft includes translation displacement and whirling displacement, the detected displacement signal includes translation displacement and whirling displacement, and the displacement signal may be detected through a displacement sensor;

Step 102: separating the whirling displacement from the displacement signal, wherein since the displacement signal detected by the displacement sensor includes the translation displacement and the whirling displacement, a separation unit 20 separates the whirling displacement from the displacement signal to separate the translation displacement and the whirling displacement for control, wherein a separation algorithm may be adopted for separation of the whirling displacement in a process of separating the whirling displacement from the displacement signal; and Step 103: controlling whirling of the shaft according to the whirling displacement, wherein since the shaft whirls more vigorously if the whirling displacement of the shaft is longer, a control unit 30 regulates and reduces the whirling displacement separated by the separation unit 20 to fulfill the aim of controlling the whirling of the shaft.

According to the embodiment of the disclosure, the shaft control method for the magnetic suspension system is adopted to separate the whirling displacement from the displacement signal and control and reduce the whirling displacement to further suppress the whirling of the shaft through the control unit 30, so that the problem of difficulty in suppression of the whirling of the shaft during high-speed rotation of the magnetic suspension system is solved, and the effect of suppressing the whirling of the shaft during high-speed rotation of the magnetic suspension system is further achieved.

Preferably, in the embodiment, whirling displacement of a front end of the shaft is detected by adopting a front bearing sensor, whirling displacement of a rear end of the shaft is detected by adopting a rear bearing sensor, and the whirling displacement is separated by adopting the following formula:

$$\begin{cases} x_{a1} = \dfrac{l_a}{l_a + l_b} * (x_a - x_b) \\ x_{b1} = \dfrac{l_b}{l_a + l_b} * (x_a - x_b) \end{cases},$$

wherein $x_{a1}$ and $x_{b1}$ are the whirling displacement of the front and rear ends of the shaft respectively, $l_a$ is a distance from a mass centre of the shaft to the front bearing sensor, $l_b$ is a distance from the mass centre of the shaft to the rear bearing sensor, $x_a$ is displacement, detected by the front bearing sensor, of the front end of the shaft deviated from a balance position, and $x_b$ is displacement, detected by the rear bearing sensor, of the rear end of the shaft deviated from the balance position. $x_a$ and $x_b$ may be obtained by the front bearing sensor and the rear bearing sensor. The front bearing sensor and the rear bearing sensor detect actually detected displacement values of the front and rear ends of the shaft respectively, and the displacement of the front and rear ends of the shaft deviated from the balance position may be obtained by subtracting the actually detected displacement values of the front and rear ends of the shaft from displacement reference values, wherein the displacement reference values are distances between the front and rear bearing sensors and the balance position.

From FIG. 3, it can be seen that the shaft performs translation movement and whirling movement in a working process, and its displacement meets relational expression (1):

$$\begin{cases} x_a = x_{a1} + x_{a2} \\ x_b = x_{b2} - x_{b1} \\ x_{a2} = x_{b2} \end{cases} \quad (1)$$

the second formula is subtracted from the first formula in the relational expression to obtain: $x_a - x_b = x_{a1} + x_{b1}$, and according to FIG. 3, the following relational expression may also be obtained:

$$\begin{cases} \dfrac{x_{a1}}{x_{a1} + x_{b1}} = \dfrac{l_a}{l_a + l_b} \\ \dfrac{x_{b1}}{x_{a1} + x_{b1}} = \dfrac{l_b}{l_a + l_b} \end{cases},$$

so that relational expression (2) of the whirling displacement at the front and rear bearings may be obtained:

$$\begin{cases} x_{a1} = \dfrac{l_a}{l_a + l_b} * (x_a - x_b) \\ x_{b1} = \dfrac{l_b}{l_a + l_b} * (x_a - x_b) \end{cases}.$$

The whirling displacement at the front and rear bearings is obtained according to the abovementioned algorithm, and a calculation process is simple, and is easy to implement in processing equipment such as a DSP. In the embodiment, the algorithm may be executed through the separation unit 20, the separation unit 20 separates the whirling displacement from the displacement signal detected by the sensor, and the control unit 30 determines the whirling displacement as a control parameter of the shaft in the magnetic suspension system, and reduces the displacement $x_{a1}$ at the front bearing and the displacement $x_{b1}$ at the rear bearing to fulfil the aim of suppressing the whirling of the shaft, achieve the effect of effectively suppressing the whirling of the shaft and improve stability of the magnetic suspension system.

Figure 7:
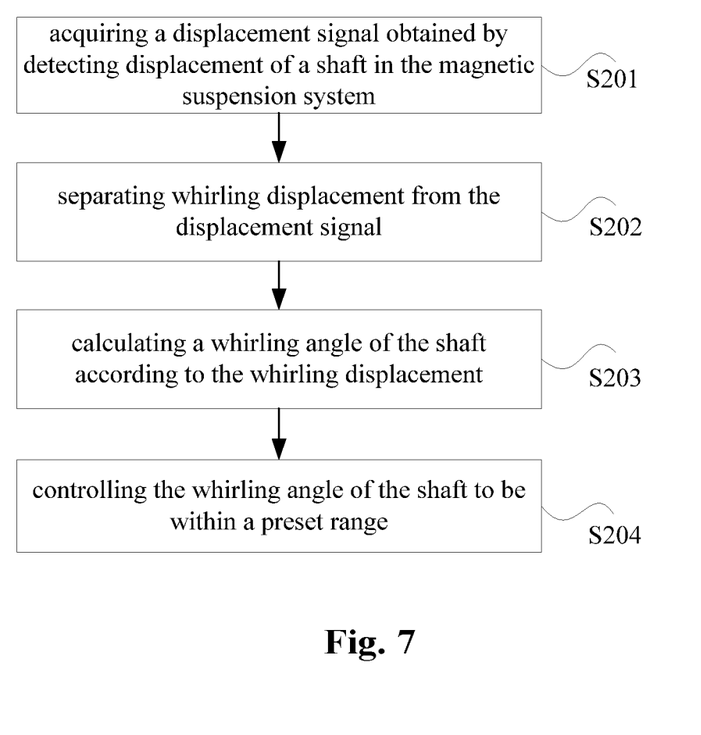
FIG. 7 is a flowchart of a shaft control method for a magnetic suspension system according to a second embodiment of the disclosure.

FIG. 7 is a flowchart of a shaft control method for a magnetic suspension system according to a second embodiment of the disclosure. The embodiment may be considered as a preferred implementation manner of the shaft control method for the magnetic suspension system shown in FIG. 6.

As shown in FIG. 7, the shaft control method for the magnetic suspension system includes the following steps:

Step 201: acquiring a displacement signal obtained by detecting displacement of a shaft in the magnetic suspension system, wherein since the displacement of the shaft includes translation displacement and whirling displacement, the detected displacement signal includes translation displacement and whirling displacement, and the displacement signal may be detected through a displacement sensor;

Step 202: separating the whirling displacement from the displacement signal, wherein since the displacement signal detected by the displacement sensor includes the translation displacement and the whirling displacement, a separation unit 20 separates the whirling displacement from the displacement signal to separate the translation displacement and the whirling displacement for control, wherein a separation algorithm may be adopted for separation of the whirling displacement in a process of separating the whirling displacement from the displacement signal;

Step 203: calculating a whirling angle of the shaft according to the whirling displacement, wherein the corresponding whirling angle is larger if the whirling displacement of the shaft is longer, and a calculation module 301 calculates the whirling angle corresponding to the whirling displacement, and determines the whirling angle as a control parameter to control the whirling of the shaft; and Step 204: controlling the whirling angle of the shaft to be within a preset range, wherein the preset range is kept within a small range in the vicinity of 0, and since the shaft whirls more vigorously and its corresponding whirling angle is larger if the whirling displacement of the shaft is longer, the whirling angle is effectively controlled to be in the vicinity of 0, and the whirling angle is controlled to be close to 0 as much as possible to effectively suppress the whirling of the shaft.

Preferably, before the whirling angle of the shaft is controlled, the whirling angle of the shaft is further enlarged. Since a value of the calculated whirling angle of the shaft is very small, the whirling angle is required to be enlarged before the whirling angle of the shaft is controlled, and an enlargement factor may be set according to a practical condition. A whirling angle ring is configured to control the whirling angle, a control parameter of the whirling angle ring is very large if the whirling angle is not enlarged, and enlarging the whirling angle may prevent the control parameter of the whirling angle ring from getting too large and facilitate debugging of the control parameter of the whirling angle ring to implement accurate control over the whirling angle, further achieve the effect of suppressing the whirling of the shaft and avoid the condition of instability caused by highly-frequent whirling of the magnetic suspension system.

Preferably, calculating the whirling angle of the shaft according to the whirling displacement includes calculating the whirling angle by adopting any one of the following manners:

$$\text{Manner 1}: \alpha = \arctan\dfrac{x_{b1}}{l_b}; \quad \text{Manner 2}: \alpha = \arctan\dfrac{x_{a1}}{l_a}; \text{ and}$$

$$\text{Manner 3}: \alpha = \arctan\dfrac{x_a - x_b}{l_a + l_b}.$$

Wherein, $\alpha$ is the whirling angle, $x_{a1}$ and $x_{b1}$ are the whirling displacement of the front and rear ends of the shaft respectively, $l_a$ is the distance from the mass centre of the shaft to the front bearing sensor, $l_b$ is the distance from the mass centre of the shaft to the rear bearing sensor, $x_a$ is the displacement, detected by the front bearing sensor, of the front end of the shaft deviated from the balance position, and $x_b$ is the displacement, detected by the rear bearing sensor, of the rear end of the shaft deviated from the balance position. According to FIG. 3 and the relational expression (2), it can be seen that $$\tan \alpha = \frac{x_{b1}}{l_b} = \frac{x_{a1}}{l_a} = \frac{x_a - x_b}{l_a + l_b},$$

and since a value of α is very small and its corresponding sine value is approximately equal to the value of α, that is, $$\alpha \approx \frac{x_{b1}}{l_b} = \frac{x_{a1}}{l_a} = \frac{x_a - x_b}{l_a + l_b},$$

a value obtained by calculating $$\frac{x_{a1}}{l_a}, \frac{x_{b1}}{l_b} \text{ and } \frac{x_a - x_b}{l_a + l_b}$$

is directly determined as the value of the whirling angle α in the embodiment to simplify calculation of the whirling angle and further implement control over the whirling angle to suppress the whirling of the shaft.

Preferably, separating the whirling displacement from the displacement signal includes separating the displacement signal to obtain the translation displacement and the whirling displacement, and after the translation displacement is obtained, the method further includes: controlling translation of the shaft according to the translation displacement, the translation displacement including the translation displacement at the front bearing and the translation displacement at the rear bearing. The displacement signal detected by the sensor includes the whirling displacement and the translation displacement, wherein a displacement signal detected by the front bearing sensor includes the whirling displacement at the front bearing and the translation displacement at the front bearing, and a displacement signal detected by the rear bearing sensor includes the whirling displacement at the rear bearing and the translation displacement at the rear bearing. The separation unit 20 separates the displacement signal to obtain the translation displacement and the whirling displacement, and the control unit 30 is further configured to control the translation displacement obtained by separating the displacement signal and control the translation movement and whirling movement of the shaft after the translation displacement and the whirling displacement are separated respectively, so that both the whirling displacement of the shaft of the magnetic suspension system and the translation displacement of the shaft of the magnetic suspension system are suppressed, and the stability of the magnetic suspension system is further improved.

Preferably, controlling the whirling of the shaft according to the whirling displacement and controlling the translation of the shaft according to the translation displacement include: controlling the translation displacement at the front bearing by adopting a first PID controller; controlling the translation displacement at the rear bearing by adopting a second PID controller; and controlling the whirling angle corresponding to the whirling displacement by adopting a third PID controller. The three PID controllers are adopted to control the translation displacement at the front bearing, the translation displacement at the rear bearing and the whirling angle, so that interference among the controllers may be reduced, and separate control over the whirling and translation of the shaft is implemented.

It is important to note that "first", "second" and "third" in the embodiment do not represent a precedence relationship, are adopted to facilitate description of the embodiment of the disclosure only, and are not intended to form improper limits to the disclosure.

Obviously, those skilled in the art should know that each module or step of the embodiment of the disclosure may be implemented by a universal computing device, and the modules or steps may be concentrated on a single computing device or distributed on a network formed by a plurality of computing devices, and may optionally be implemented by programmable codes executable for the computing devices, so that the modules or steps may be stored in a storage device for execution with the computing devices, or may form each integrated circuit module respectively, or multiple modules or steps therein may form a single integrated circuit module for implementation. As a consequence, the disclosure is not limited to any specific hardware and software combination.

The above is only the preferred embodiment of the disclosure and not intended to limit the invention, and for those skilled in the art, the disclosure may have various modifications and variations. Any modifications, equivalent replacements, improvements and the like within the spirit and principle of the invention shall fall within the scope of protection of the invention.

What is claimed is:

1. A shaft control method for a magnetic suspension system, comprising:
    acquiring, by a displacement sensor, a displacement signal obtained by detecting displacement of a shaft in the magnetic suspension system;
    separating, by a Digital Signal Processor (DSP), whirling displacement from the displacement signal; and
    controlling, by a controller, whirling of the shaft according to the whirling displacement;
    wherein separating the whirling displacement from the displacement signal comprises separating the displacement signal to obtain translation displacement and the whirling displacement, and after the translation displacement is obtained, the method further comprises: controlling, by the controller, translation of the shaft according to the translation displacement, the translation displacement comprising translation displacement at a front bearing and translation displacement at a rear bearing;
    wherein controlling, by the controller, the whirling of the shaft according to the whirling displacement and controlling the translation of the shaft according to the translation displacement comprise: controlling the translation displacement at the front bearing by adopting a first Proportion Integration Differentiation (PID) controller; controlling the translation displacement at the rear bearing by adopting a second PID controller; and controlling the whirling angle corresponding to the whirling displacement by adopting a third PID controller; and
    wherein the three PID controllers are adopted to perform separate control the translation displacement at the front bearing, the translation displacement at the rear bearing and the whirling angle, wherein that the three PID controllers are adopted to perform separate control the translation displacement at the front bearing, the translation displacement at the rear bearing and the whirling angle comprises: the translation displacement at the front bearing, the translation displacement at the rear bearing and the whirling angle are determined as feedback parameters, and are sent to feedback input ends of the first PID controller, the second PID controller and the third PID controller respectively.

2. The shaft control method for the magnetic suspension system according to claim 1, wherein displacement of a front end of the shaft deviated from a balance position is detected by adopting a front bearing sensor, displacement of a rear end of the shaft deviated from the balance position is detected by adopting a rear bearing sensor, and the whirling displacement is separated by adopting the following formula:

$$\begin{cases} x_{a1} = \dfrac{l_a}{l_a + l_b} * (x_a - x_b) \\ x_{b1} = \dfrac{l_b}{l_a + l_b} * (x_a - x_b) \end{cases},$$

where $x_{a1}$ and $x_{b1}$ are whirling displacement of the front and rear ends of the shaft respectively, $l_a$ is a distance from a mass centre of the shaft to the front bearing sensor, $l_b$ is a distance from the mass centre of the shaft to the rear bearing sensor, $x_a$ is the displacement, detected by the front bearing sensor, of the front end of the shaft deviated from the balance position, and $x_b$ is the displacement, detected by the rear bearing sensor, of the rear end of the shaft deviated from the balance position.

3. The shaft control method for the magnetic suspension system according to claim 1, wherein controlling, by the controller, the whirling of the shaft according to the whirling displacement comprises:

calculating a whirling angle of the shaft according to the whirling displacement; and controlling the whirling angle of the shaft to be within a preset range.

4. The shaft control method for the magnetic suspension system according to claim 3, wherein calculating the whirling angle of the shaft according to the whirling displacement comprises calculating the whirling angle by adopting any one of the following manners:

Manner 1:

$$\alpha = \arctan\dfrac{x_{b1}}{l_b},$$

Manner 2:

$$\alpha = \arctan\dfrac{x_{a1}}{l_a}, \text{ and}$$

Manner 3:

$$\alpha = \arctan\dfrac{x_a - x_b}{l_a + l_b},$$

where $\alpha$ is the whirling angle, $x_{a1}$ and $x_{b1}$ are the whirling displacement of the front and rear ends of the shaft respectively, $l_a$ is the distance from the mass centre of the shaft to the front bearing sensor, $l_b$ is the distance from the mass centre of the shaft to the rear bearing sensor, $x_a$ is the displacement, detected by the front bearing sensor, of the front end of the shaft deviated from the balance position, and $x_b$ is the displacement, detected by the rear bearing sensor, of the rear end of the shaft deviated from the balance position.

5. A shaft control device for a magnetic suspension system, comprising:

a displacement sensor, configured to acquire a displacement signal obtained by detecting displacement of a shaft in the magnetic suspension system;

a Digital Signal Processor (DSP), configured to separate whirling displacement from the displacement signal; and a controller, configured to control whirling of the shaft according to the whirling displacement;

wherein the DSP is configured to separate the displacement signal to obtain translation displacement and the whirling displacement, and the controller is further configured to, after the translation displacement is obtained, control translation of the shaft according to the translation displacement, the translation displacement comprising translation displacement at a front bearing and translation displacement at a rear bearing;

wherein the controller is configured to: control the translation displacement at the front bearing by adopting a first Proportion Integration Differentiation (PID) controller; control the translation displacement at the rear bearing by adopting a second PID controller; and control the whirling angle corresponding to the whirling displacement by adopting a third PID controller; and wherein the three PID controllers are adopted to perform separate control the translation displacement at the front bearing, the translation displacement at the rear bearing and the whirling angle, wherein that the three PID controllers are adopted to perform separate control the translation displacement at the front bearing, the translation displacement at the rear bearing and the whirling angle comprises: the translation displacement at the front bearing, the translation displacement at the rear bearing and the whirling angle are determined as feedback parameters, and are sent to feedback input ends of the first PID controller, the second PID controller and the third PID controller respectively.

6. The shaft control device for the magnetic suspension system according to claim 5, wherein whirling displacement of a front end of the shaft is detected by adopting a front bearing sensor, whirling displacement of a rear end of the shaft is detected by adopting a rear bearing sensor, and the DSP is configured to separate the whirling displacement by adopting the following formula:

$$\begin{cases} x_{a1} = \dfrac{l_a}{l_a + l_b} * (x_a - x_b) \\ x_{b1} = \dfrac{l_b}{l_a + l_b} * (x_a - x_b) \end{cases}$$

where $x_{a1}$ and $x_{b1}$ are the whirling displacement of the front and rear ends of the shaft respectively, $l_a$ is a distance from a mass centre of the shaft to the front bearing sensor, $l_b$ is a distance from the mass centre of the shaft to the rear bearing sensor, $x_a$ is displacement, detected by the front bearing sensor, of the front end of the shaft deviated from a balance position, and $x_b$ is displacement, detected by the rear bearing sensor, of the rear end of the shaft deviated from the balance position.

7. The shaft control device for the magnetic suspension system according to claim 5, wherein the controller comprises:

a calculation element, configured to calculate a whirling angle of the shaft according to the whirling displacement; and a control element, configured to control the whirling angle of the shaft to be within a preset range.

8. The shaft control device for the magnetic suspension system according to claim 7, wherein the calculation element is configured to calculate the whirling angle by adopting any one of the following manners:

Manner 1:
$$\alpha = \arctan\frac{x_{b1}}{l_b},$$

Manner 2:
$$\alpha = \arctan\frac{x_{a1}}{l_a}, \text{ and}$$

Manner 3:
$$\alpha = \arctan\frac{x_a - x_b}{l_a + l_b},$$

where $\alpha$ is the whirling angle, $x_{a1}$ and $x_{b1}$ are the whirling displacement of the front and rear ends of the shaft respectively, $l_a$ is the distance from the mass centre of the shaft to the front bearing sensor, $l_b$ is the distance from the mass centre of the shaft to the rear bearing sensor, $x_a$ is the displacement, detected by the front bearing sensor, of the front end of the shaft deviated from the balance position, and $x_b$ is the displacement, detected by the rear bearing sensor, of the rear end of the shaft deviated from the balance position.

* * * * *